US006976228B2

(12) United States Patent
Bernhardson

(10) Patent No.: US 6,976,228 B2

(45) Date of Patent: *Dec. 13, 2005

(54) GRAPHICAL USER INTERFACE COMPRISING INTERSECTING SCROLL BAR FOR SELECTION OF CONTENT

(75) Inventor: Marcus Bernhardson, Linköping (SE)

(73) Assignee: Nokia Corporation, Espoo (FI)

( * ) Notice: Subject to any disclaimer, the term of this patent is extended or adjusted under 35 U.S.C. 154(b) by 639 days.

This patent is subject to a terminal disclaimer.

(21) Appl. No.: 09/891,330

(22) Filed: Jun. 27, 2001

(65) Prior Publication Data

US 2003/0001898 A1 Jan. 2, 2003

(51) Int. Cl.[7] .......................... G06F 3/00; G06F 9/00; G06F 17/00

(52) U.S. Cl. ...................... 715/830; 715/841; 715/836; 715/833; 715/786; 725/40; 725/53

(58) Field of Search ............................... 345/841, 427, 345/336; 725/40, 53; 348/564; 715/830, 715/833, 786

(56) References Cited

U.S. PATENT DOCUMENTS

| | | | | |
|---|---|---|---|---|
| 5,059,965 A | | 10/1991 | Geiser | 340/995 |
| 5,283,560 A | | 2/1994 | Bartlett | 345/113 |
| 5,289,573 A | | 2/1994 | Kataoka et al. | 395/156 |
| 5,452,414 A | * | 9/1995 | Rosendahl et al. | 345/836 |
| 5,623,613 A | * | 4/1997 | Rowe et al. | 345/841 |
| 5,677,708 A | | 10/1997 | Matthews, III et al. | 345/115 |
| 5,737,029 A | | 4/1998 | Ohkura et al. | |
| 5,812,123 A | | 9/1998 | Rowe et al. | |
| 6,243,071 B1 | | 6/2001 | Shwarts et al. | |
| 6,412,110 B1 | * | 6/2002 | Schein et al. | 725/40 |
| 6,483,548 B1 | * | 11/2002 | Allport | 348/564 |
| 6,594,825 B1 | * | 7/2003 | Goldschmidt Iki et al. | 725/53 |
| 6,597,358 B2 | * | 7/2003 | Miller | 345/427 |

FOREIGN PATENT DOCUMENTS

| | | | |
|---|---|---|---|
| EP | 0 845 604 | 3/1995 | |
| EP | 0645604 | 3/1995 | G01C 21/20 |
| WO | 0065429 | 11/2000 | G06F 3/033 |

* cited by examiner

*Primary Examiner*—Kristine Kincaid
*Assistant Examiner*—Boris Pesin
(74) *Attorney, Agent, or Firm*—Antonelli, Terry, Stout and Kraus, LLP.

(57) ABSTRACT

A digital interactive television set has a graphical user interface for displaying content from a plurality of different sources on its screen e.g. from digital satellite or cable broadcasts or through the Internet, the interface comprising: a focus region (16), and horizontally and vertically extending scroll bars (H, V) which each comprise a plurality of scroll bar elements that can be scrolled successively through the focus region, the scroll bar elements of the horizontal scroll bar signifying groupings of content sources. Elements of the horizontal scroll bar are scrolled individually into the focus region, and the scroll bar elements of the vertical scroll bar signify content sources which are included within a grouping thereof associated with the individual element of the horizontal scroll bar, so that the scroll bar elements of the vertical scroll bar can then be scrolled through the focus region to select a content source of the grouping. The scroll bar elements of the horizontal scroll bar comprise a three dimensional depiction of more than one of the content source groupings, and an individual one of the groupings may be selected from the three dimensional depiction for the focus region. The three dimensional elements are the horizontal scroll bar may comprise rectangular blocks that are rotatable about a common longitudinal axis.

23 Claims, 3 Drawing Sheets

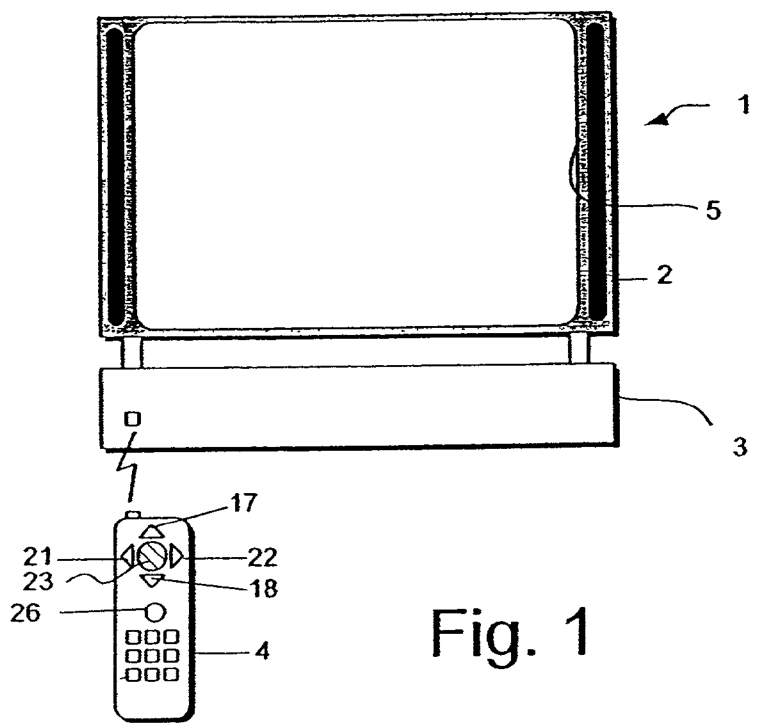
Fig. 1
Fig. 2
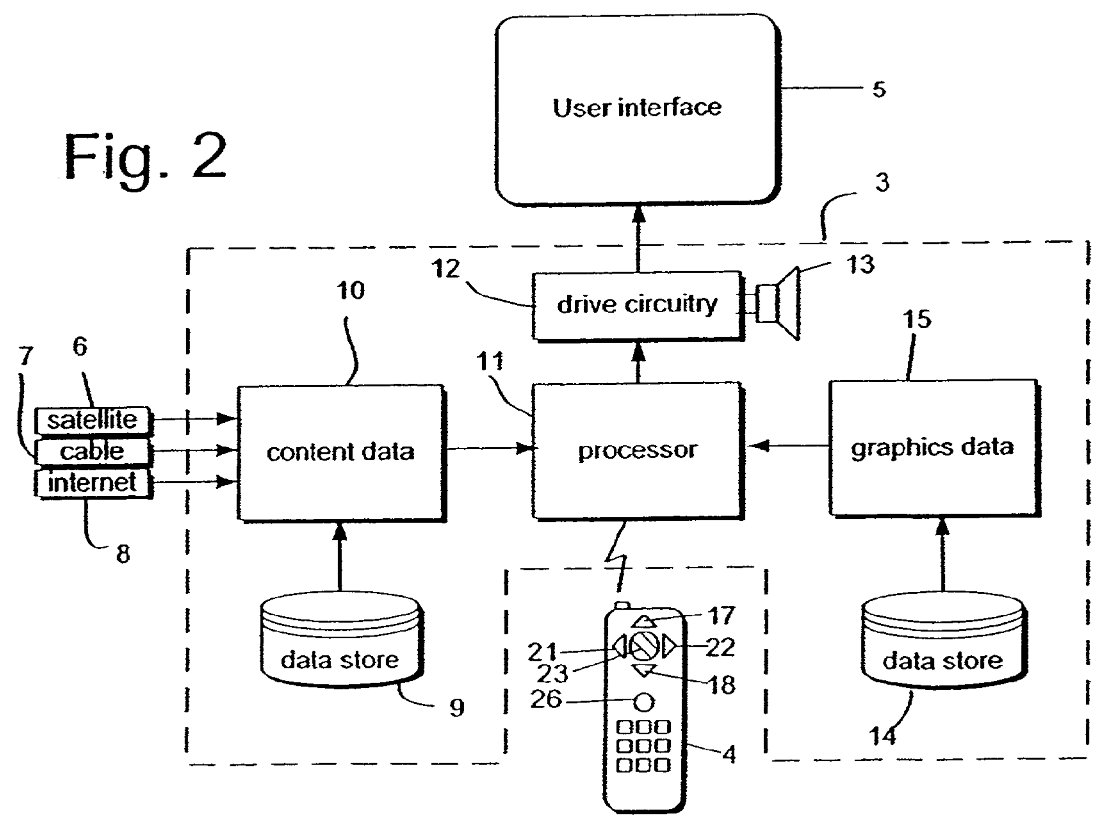

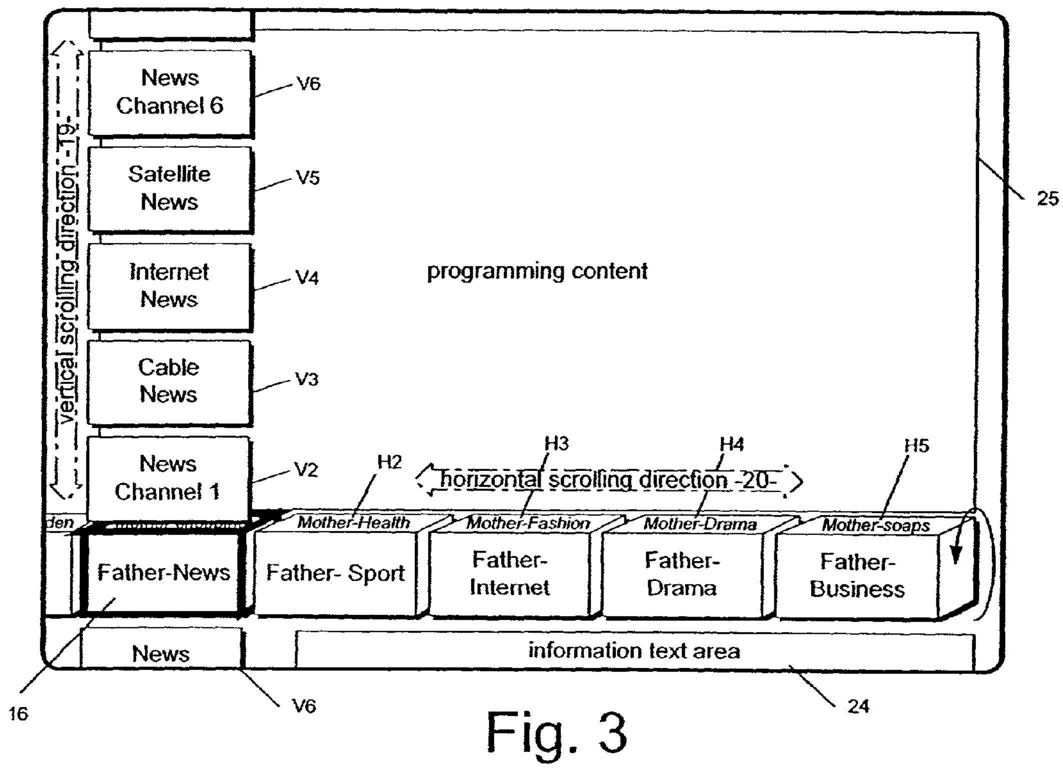
Fig. 3
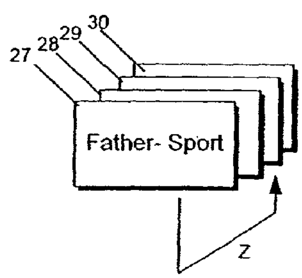
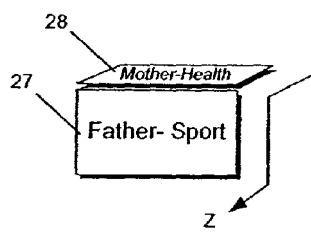
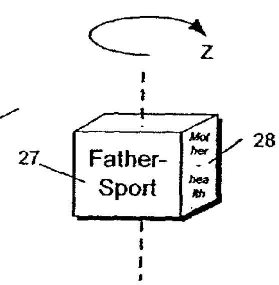
Fig. 5 Fig. 6 Fig. 7

GRAPHICAL USER INTERFACE COMPRISING INTERSECTING SCROLL BAR FOR SELECTION OF CONTENT

BACKGROUND OF THE INVENTION

1. Field of the Invention

This invention relates to providing a graphical user interface for selecting content from a plurality of content sources and has particular but not exclusive application to an interactive multi-channel television set for selecting content from a variety of different sources such as digital television broadcast channels, pre-recorded content and the Internet.

2. Description of the Prior Art

Multiple channel television sets which can receive a multiplicity of digital broadcast channels via terrestrial broadcasts, satellite or cable are becoming popular. Very large numbers of channels can be transmitted by digital techniques, and so improved channel management systems are needed to enable the viewer to make an informed selection without having to surf all of the available channels. The television set can also be used to provide Internet access so it is desirable to provide a system which can bookmark individual web sites and pages that are of interest to the user.

Proposals have been made to provide a conventional computer keyboard for connection to a television set in order to enable management of the Internet and channel access. However, conventional television sets are usually provided with a handheld remote control device that communicates with the television set through an infrared link. The handheld device has limited functionality as compared with a conventional keyboard but is more convenient to use than the keyboard in most viewing situations.

International Published Application WO 00/65429 discloses a graphical user interface for display on a screen such as the monitor of a television set, in which object fields corresponding to pre-defined choices of content sources is displayed in a vertical column of object fields and a horizontal row of subordinate object fields. The row and the column extend along vertical and horizontal side edges of the display screen respectively. The row and the column intersect in a focus area and are each scrollable that is act as scroll bars so that the individual object fields can be scrolled into the focus area. Each of the object fields in the column may define a general group of content sources and thus may act as a folder which contains a number of individual bookmarks for Internet sites and channels of interest to the user. When the individual object field or folder is brought into the focus area by scrolling the vertical scroll bar, the horizontal scroll bar is populated with bookmarks associated with the folder. The user can then scroll the horizontal scroll bar to bring the bookmarks into the focus area and then select the bookmark in the focus area. The bookmark in the focus area may itself contain a number of sub-object fields, and if so, these are then displayed in the object fields of the vertical scroll bar so that the vertical scroll bar can again be scrolled in order to make a selection from them.

This configuration has the advantage that the scroll bars, which extend vertically and horizontally, can conveniently be controlled by the conventional vertical and left and right scrolling or arrow keys of the handheld remote control device and thus can be operated intuitively by the user. However, the arrangement has the disadvantage that because successive selections of the vertical and horizontal scroll bars need to be made, the user can become confused by the navigational process.

SUMMARY OF THE INVENTION

The invention provides a graphical user interface which may be used to select content sources which is easier for the user to navigate.

Broadly stated, the invention provides a device to provide a graphical user interface for selecting content from a plurality of sources thereof, the user interface comprising: a focus region, and first and second transversely extending scroll bars which each comprise a plurality of scroll bar elements that can be scrolled successively through the focus region, the scroll bar elements of the first scroll bar signifying groupings of content sources, such that when elements of the first scroll bar are scrolled individually into the focus region, the scroll bar elements of the second scroll bar signify content sources which are included within a grouping thereof associated with the individual element of the first scroll bar, whereby the scroll bar elements of the second scroll bar can be scrolled through the focus region to select a content source of the grouping, at least one of the scroll bar elements of the first scroll bar comprising a multiple depiction of more than one of the content source groupings, whereby an individual one of the groupings may be selected from the multiple depiction for the focus region.

The multiple depiction of the content source groupings may comprise a three dimensional depiction such that the scroll bar elements of the first scroll bar include facets that signify the individual groupings of the content sources. The facets may be associated with respective different users such as different family members The scroll bar elements may be polygonal and rotatable about a common axis extending longitudinally of the first scroll bar and the elements may be rotatable in unison about the axis.

A controller, such as a wireless remote controller may be provided to enable a user to scroll the scroll bars individually through the focus region. The invention has particular application to digital television sets and set top boxes.

BRIEF DESCRIPTION OF THE DRAWINGS

Further objects and advantages of the invention will be better understood from the following detailed description given in conjunction with the accompanying drawings, in which FIG. 1 is a schematic illustration of a television set and an associated infrared remote controller;

FIG. 2 is a schematic block diagram illustrating the circuitry of the arrangement shown in FIG. 1;

FIG. 3 is a schematic illustration of an display of the graphical user interface provided on the television set, showing vertical and horizontal scroll bars;

FIGS. 5, 6 and 7 illustrate alternative configurations for the scroll bar elements.

DETAILED DESCRIPTION OF THE INVENTION

Figure 4A:
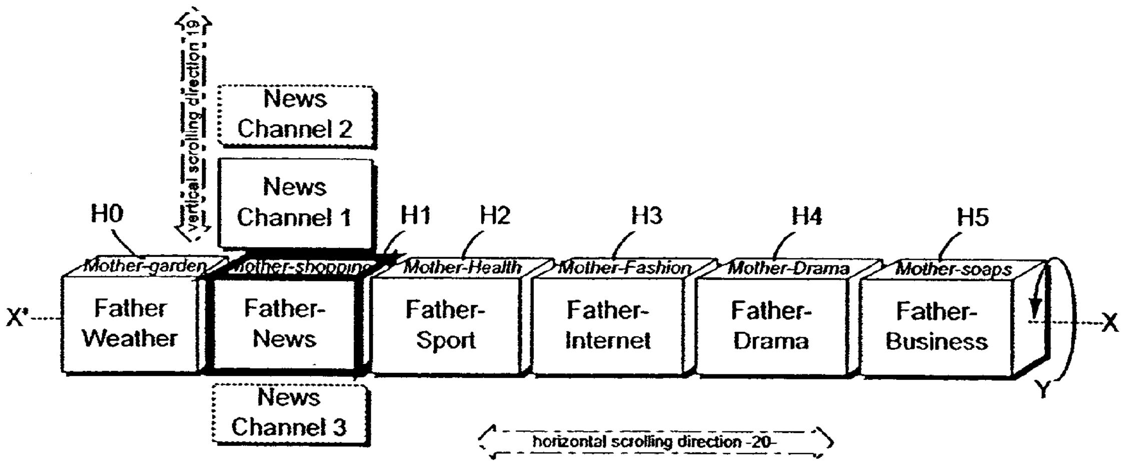
FIGS. 4A–C illustrate successive steps in the operation of the horizontal scroll bar shown in FIG. 3.

Referring to FIG. 1, a home entertainment device 1 includes a television display monitor 2, control unit 3 and a handheld remote controller 4 coupled through a wireless link for example infrared, to the control unit 3.

The TV monitor 2 is configured to display content from a plurality of a different sources such as satellite transmissions, cable transmissions and materials received through the Internet as well as locally stored content. Thus, the TV monitor 2 may comprise a conventional television set and the control unit 3 may comprise a set top box providing suitable signals to the television set 2. Alternatively, the TV monitor 2 may be solely a monitor and the control unit 3 provides data for direct display on the monitor. As another alternative, the units 2, 3 may comprise a personal computer. In the following example, the TV monitor 2 comprises a conventional television set with a display screen 5 and the control unit 3 comprises a set top box configured to receive multi-channel digital broadcast transmissions via satellite and cable, and also is provided with an Internet connection.

The major circuit components of the set top box are shown in more detail in FIG. 2. The set top box 3 shown within dotted outline receives digital satellite multi-channel transmissions from a satellite source 6 shown schematically. Similarly, cable digital transmissions are received from source 7. The set top box 3 also has an Internet connection 8.

The set top box 3 may also include a device for retrieving digital data from a pre-recorded source, such as a DVD or hard disc shown schematically as data store 9.

Programming content data from the sources 6, 7, 8 and 9 is fed to content data control circuitry 10 which appropriately passes or otherwise prepares the data from the individual source for display on the screen 5 of the TV monitor 2. Selection of the programming content data to be displayed is made by means of the infrared controller 4, which controls operation of a program controlled processor 11. The controlling program provides the graphics user interface. The program may be stored in ROM in the processor 11 or in the data store 14.

The data selected by the processor 11 is fed to drive circuitry 12 to render the data in an appropriate form for display by the TV display 5. As well known in the art, the data also includes audio data which is fed to a loudspeaker shown schematically by loudspeaker 13. It will be understood that the circuitry includes appropriate D to A converters although these are not shown in order to simplify the description. The loudspeaker 13 may comprise a conventional loudspeaker in the TV monitor rather than in the set top box 3 as shown.

In accordance with the invention, the set top box 3 is configured to provide a graphical user interface on the display screen 5 to enable the user to select the content source to be displayed. Data for the graphical user interface is held in a data store 14 and is supplied to the processor 11 by graphics display circuitry 15, so as to be included in the display on screen 5.

An example of the graphical user interface is shown in FIG. 3. The interface comprises a vertically extending scroll bar V which extends generally vertically adjacent to the left hand side edge of screen 5, together with a horizontally extending scroll bar H that extends generally horizontally adjacent to the lowermost horizontal edge of screen 5. The scroll bars intersect in a focus region 16 in the lower left hand corner of the display 5.

Each of the scroll bars V, H comprise a series of scroll bar elements $V_0$–$V_M$ and $H_0$–$H_N$. Considering the vertical scroll bar V, the scroll bar elements $V_0$–$V_M$ comprise individual object fields in which information concerning sources of program content can be displayed. In this example, the vertical scroll bar elements comprise essentially two-dimensional rectangular displays. The scroll bar elements V can be scrolled vertically through the focus region 16 by use ofthe "up" and "down" scroll buttons 17 and 18, so as to achieve scrolling in the direction of arrow 19 shown in FIG. 3. The scroll bar elements $H_0$–$H_N$ comprise depictions of three dimensional elements which include more than one object field. In the example of FIG. 3, the horizontal elements comprise polygonal elements, in the form of a three dimensional rectangular block for which the individual faces or facets comprise individual object fields. The horizontal scroll bar H can be scrolled left and right in horizontal scrolling direction 20 under the control of "left" and "right" scrolling buttons 21, 22 on the remote controller 4 shown in FIG. 1. Thus, the horizontal scroll bar can be scrolled so as to move the individual scroll bar elements into the focus region 16. The user interface is so arranged that when an individual horizontal scroll bar element is moved into the focus region 16, the objects fields for the vertically extending scroll bar elements V are populated with a group of objects which signify individual content sources i.e. to provide details concerning content sources that fall within a group associated with the individual horizontal scroll bar element displayed in the focus region 16. The population of the individual vertical scroll bar elements with the content source information is initiated by depressing a select button 23 on the remote controller 4 shown in FIG. 1. As will be explained in more detail hereinafter, the horizontal scroll bar elements can be personalized for individual users of the home entertainment device. For example in a family, the scroll bar can be configured for use by father, mother, son and daughter. In the example of FIG. 3, the horizontal scroll bar has been configured for use by the father and a horizontal scroll bar element $H_1$ concerning "news" has been horizontally scrolled into the focus region 16. Then, by depressing the select button 23 on the remote controller, the vertical scroll bar elements are populated with details concerning content sources that the father has selected to form a group associated with "news" for the horizontal scroll bar element $H_1$. Having selected the scroll bar element $H_1$ for "news" in the focus region 16, the user can then operate the vertical scrolling keys 17, 18 on the controller 4 to scroll the vertical scroll bar V so as to move one of the vertical scroll bar elements V into the focus region 16. As shown in FIG. 3, the vertical scroll bar elements may individually signify different sources of news programming content or example broadcast news channel 1 ($V_2$) which may be conventional broadcast channel, cable news channel 2 ($V_3$), received through the cable programming source 7 (FIG. 2), an Internet news site ($V_4$) accessible through the Internet source 8 and a satellite news channel ($V_5$) for which content is received from the source 6 shown in FIG. 2. When the desired vertical scroll bar element has been scrolled into the focus region 16, the select button 23 of the controller 4 is operated, which results in the programming source being selected and displayed on the display 5. Textual information concerning the selected programming source is displayed optionally in a text area 24 on the display. The programming content itself for the selected source is initially display in region 25. Thereafter, the graphical user interface can be switched off and the programming content displayed over the entire area of the screen 5. This may be at the control of the user or after a predetermined time following operation of the select button 23. Also, the programming content when displayed in region 25 may be used to provide a preview of the content of individual programming sources. Thus, by scrolling the vertical scroll bar, individual scroll bar elements can be moved into the focus region 16 and their corresponding content displayed as a preview.

Figure 4B:
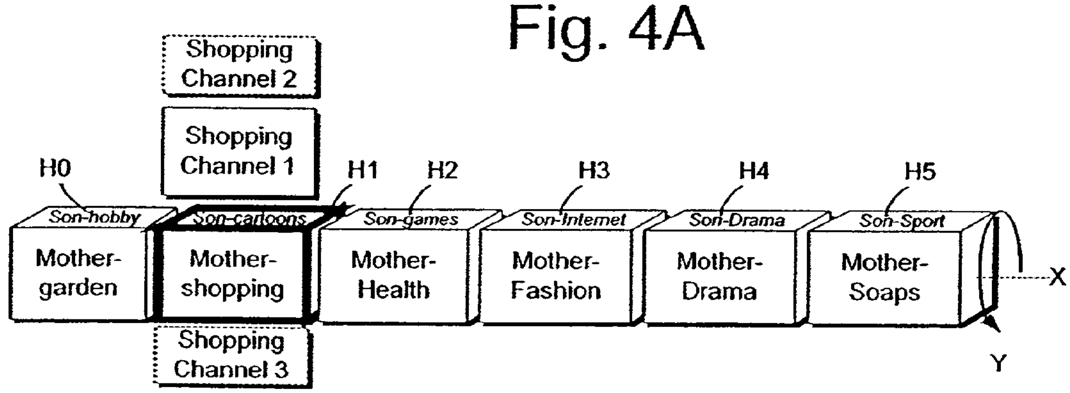

In accordance with the invention, the horizontal scroll bar elements H comprise three-dimensional depictions of more than one content source grouping. Thus, in the example of FIG. 3, the horizontal bar elements each provide content source groupings for individual family members—father, mother, son, daughter. The groupings for individual family members can be selected by rotating the horizontal scroll bar about its longitudinal axis as shown in FIG. 4. FIG. 4A illustrates the configuration of scroll elements shown in FIG. 3, with father's content source groupings, facing forwardly; hence father's groupings are active. In order to activate the groupings for other family members, the scroll bar is rotated about longitudinal axis X–X' in the direction of arrow Y. This may be achieved by operating the controller 4. For example, a "rotate" button 26 may be depressed, which causes the horizontal scroll bar to rotate through 90° into the configuration shown in FIG. 4B, with mother's groupings facing forward and hence active. Considering the scroll bar elements $H_1$ that is located in the focus region 16, the grouping "mother-shopping" is brought into the active focus region by the rotation of the horizontal scroll bar. Then, if the select button 23 is depressed, the vertical scroll bar is populated with programming sources concerning shopping, as shown in FIG. 4*b*. Furthermore, the horizontal scroll bar can then be scrolled to bring other horizontal scroll bar elements into the focus region 16 for example element $H_3$, in which case the vertical scroll bar element can be populated with programming source information concerning "fashion". Thereafter, an individual programming source can be selected by scrolling the vertical scroll bar as previously described.

Figure 4C:
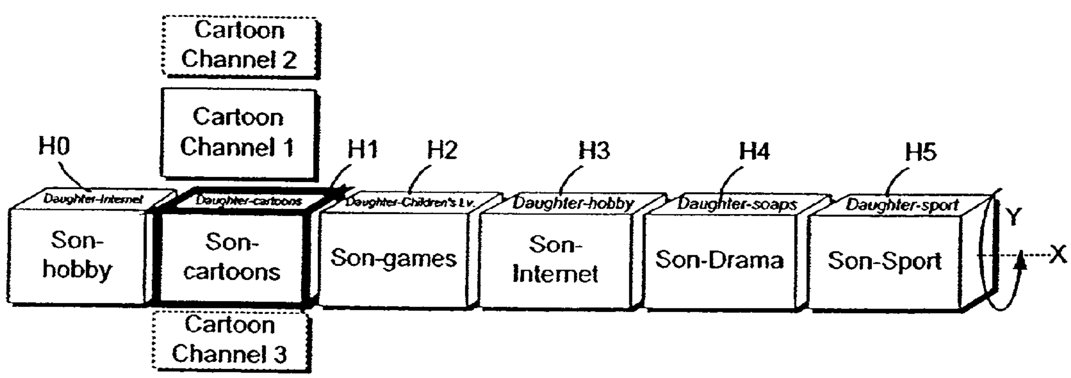

Content groupings for the other family members can be selected by further rotating the horizontal scroll bar H. As shown in FIG. 4C, thr groupings for "son" are rendered active. It will be understood that a further rotation of the scroll bar will select the groupings for "daughter".

The naming of the facets for the individual horizontal scroll bar elements can be carried out using keys of the remote controller 4 and the user may use the remote controller to select the groups of programming content sources, and the sources to be included in the groups during an initial setting up operation. Thus, the users: father, mother etc can select their groupings and sources to be included in the groupings.

Many modifications and variations of the graphical user interface fall within the scope of the invention. For example, the horizontal scroll bar elements H may be rotatable individually rather than in unison. The program may produce drive signals to speaker 13 to provide a distinctive sound each time the horizontal scroll bar is rotated. Furthermore, the scroll bar elements of the vertical scroll bar may comprise sub-groupings of program source information contained in the corresponding horizontal scroll bar element, rather than data concerning a single programming source. Thus, the individual vertical scroll bar elements may comprise three dimensional depictions of a plurality of program sources, in the manner of the horizontal scroll bar elements, which are individually rotatable to select an individual program source to be scrolled vertically into the focus region 16.

Alternative forms of scroll bar element are shown in FIGS. 5, 6, and 7. FIG. 5 illustrates an alternative form of the horizontal scroll bar element $H_2$ shown in FIG. 3. As previously explained, four rectangular facets of the three dimensional rectangular block shown in FIG. 3 signify individual program source groupings. In the modification of FIG. 5, the four facets are configured as a three dimensional stack of files 27–30 which contain the four individual groupings associated with block $H_2$ i.e. father—sport, mother—health, son—games and daughter—children's TV. Operation of the rotate button 26 on controller 4 causes the facets to be shuffled so that the first, active file is taken to the back of the stack. Thus, as shown in FIG. 5, the file 27 is currently active and on operation of the button 26, is moved in the direction of arrow Z to the back of the stack, so as to reveal file 28—mother—health. Further operations of the rotate button 26 offer the other files in the stack for selection.

In the modification of FIG. 6, the three dimensional rectangular block $H_2$ is depicted in a more schematic form, with only two of the facets being shown, so as to display to the user the active face 27 together with the next available face 28 available for selection. Operation of the rotate button 26 causes facet 28 to move into the position of facet 27, which itself moves out of view. Facet 28 then becomes replaced by facet 29. In FIG. 6, the facets 27, 28 are shown as if they were part of a rectangular block but the angular disposition need not be at right angles; a non-rectangular configuration could be used if desired.

Another modification is shown in FIG. 7 in which the individual scroll bar elements are configured to rotate about a vertical axis rather than the horizontal axis X–X' shown in FIG. 4. Thus, successive operations of the rotate button 26 of the controller 4 causes the block to rotate about the vertical axis in the direction of arrow Z to select the facets as previously described.

It will be understood that any of the modifications of FIGS. 5 to 7 could be applied to the vertical scroll bar elements. Furthermore, other scroll bar element configurations can be used, for example non-rectangular polygonal elements. Whilst the invention has been described in relation to a home entertainment device, it will be understood that the graphical user interface can be used in other situations, for example in connection with a home computer, gaming devices and vending machines. Thus, it will be evident that the content sources need not necessarily be remote broadcast sources and the content need not necessarily be programmed content data.

I claim:

1. A device to provide a graphical user interface for selecting content from a plurality of sources thereof, the user interface comprising:

first and second transversely extending and intersecting scroll bars which each comprise a plurality of scroll bar elements that can be scrolled successively through a focus region positioned at an intersection between the first and second scroll bars;

the scroll bar elements of the first scroll bar signifying groupings of content sources, such that when elements of the first scroll bar are scrolled individually into the focus region, the scroll bar elements of the second scroll bar signify content sources which are included within a grouping thereof associated with the individual element of the first scroll bar, whereby the scroll bar elements of the second scroll bar can be scrolled through the focus region to select a content source of the grouping;

at least one of the scroll bar elements of the first scroll bar being preprogrammed to comprise a multiple depiction of more than one of said content source groupings, whereby an individual one of the groupings may be selected from the multiple depiction for the focus region; and a viewing region for viewing the contents associated with said content sources selected in dependence on the depiction in the focus region.

2. The device of claim 1 wherein the elements are polygonal and are rotatable about a common axis extending longitudinally of the first scroll bar.

3. The device of claim 2 wherein the elements are rotatable in unison about said axis.

4. The device in accordance with claim 1 comprising:

a controller to allow users to define content source groupings; and wherein the elements of the first scroll bar signifying the user-defined groupings of content sources; and at least one of the scroll bar elements of the first scroll bar is pre-programmed to confine a multiple depiction of more than one of said user-defined content source groupings whereby an individual one of the user-defined groupings may be selected from the multiple depiction for the focus region.

5. The device of claim 4 wherein the multiple depiction of said more than one user-defined content source groupings comprises a three dimensional depiction thereof.

6. The device of claim 5 wherein the controller is further operable by a user to scroll the scroll bars individually through the focus region.

7. The device of claim 6 wherein the controller includes a selector device to select a content source corresponding to an individual scroll bar element when scrolled into the focus region.

8. The device of claim 4 wherein the scroll bar elements of the first scroll bar include facets that signify individual user-defined groupings of the content sources.

9. The device of claim 8 wherein the elements each include facets associated with respective different users.

10. An interactive display device for displaying content from a plurality of different sources thereof on a display screen, comprising:

circuitry to be coupled to the display screen for providing thereon a graphical user interface device for selecting content from the sources thereof, the user interface comprising first and second transversely extending and intersecting scroll bars which each comprise a plurality of scroll bar elements that can be scrolled successively through a focus region positioned at an intersection between the first and second scroll bar, the scroll bar elements of the first scroll bar signifying groupings of content sources, such that when elements of the first scroll bar are scrolled individually into the focus region, the scroll bar elements of the second scroll bar signify content sources which are included within a grouping thereof associated with the individual element of the first scroll bar, whereby the scroll bar elements of the second scroll bar can be scrolled through the focus region to select a content source of the grouping, at least one of the scroll bar elements of the first scroll bar being pre-programmed to comprise a multiple depiction of more than one of said content source groupings whereby an individual one of the groupings may be selected from the multiple depiction for the focus region, and a viewing region for viewing the contents associated with said content sources selected in dependence on the depiction in the focus region; and a controller operable by a user to control operation of said circuitry such that the scroll bars of the graphical user interface are scrolled individually through the focus region so that the user can select a content source to be displayed in the viewing region of the display screen.

11. The device of claim 10 further including the display screen.

12. The device according to claim 10 comprising a control unit for multi-channel television set.

13. The device according to claim 12 and comprising a set top box.

14. The device according to claim 10 configured to receive programming data selected from a group consisting of satellite transmissions, cable transmissions, the Internet and pre-recorded digital data.

15. The device of claim 10 wherein the controller comprises a handheld device connected to the circuitry by a wireless link.

16. The device in accordance with claim 10 comprising:

a controller to allow users to define content source groupings; and wherein the elements of the first scroll bar signifying the user-defined groupings of content sources; and the scroll bar elements of the second scroll bar signify content sources which are included within the user-defined groupings thereof associated with the individual elements of the first scroll bar whereby the scroll bar elements of the second scroll bar can be scrolled through the focus region to select a content source of the user-defined groupings, at least one of the scroll bar elements of the first scroll bar are pre-programmed to comprise a multiple depiction of more than one of the said user-defined content source groupings, whereby an individual one of the user-defined groupings may be selected from the multiple depiction for the focus region.

17. The device of claim 16 wherein the multiple depiction of said more than one user-defined content source groupings comprises a three dimensional depiction thereof.

18. A storage medium provided with a program for execution by a processor to provide a graphical user interface for selecting content from a plurality of sources thereof, the user interface comprising first and second transversely extending and intersecting scroll bars which each comprise a plurality of scroll bar elements that can be scrolled successively through a focus region positioned at an intersection between the first and second scroll bars, the scroll bar elements of the first scroll bar signifying groupings of content sources, such that when elements of the first scroll bar are scrolled individually into the focus region, the scroll bar elements of the second scroll bar signify content sources which are included within a grouping thereof associated with the individual element of the first scroll bar, whereby the scroll bar elements of the second scroll bar can be scrolled through the focus region to select a content source of the grouping, at least one of the scroll bar elements of the first scroll bar being pre-programmed to comprise a multiple depiction of more than one of said content source groupings, whereby an individual one of the groupings may be selected from the multiple depiction for the focus region and a viewing region for viewing the contents associated with said content sources selected in dependence on the depiction in the focus region.

19. The storage medium of claim 18 wherein the program is to control operation of the processor in dependence on regions from a controller, and wherein a number of content source groupings have been defined by users; and the elements of the first scroll bar signifying the user-defined groupings of control sources, the scroll bar elements of the second scroll bar can be scrolled through the focus region to select a content source of the user-defined grouping, at least one of the scroll bar elements of the first scroll bar are pre-programmed to comprise a multiple depiction of more than one of said user-defined content source groupings whereby an individual one of the user-defined groupings may be selected from the multiple depiction for the focus region.

20. A method of operating a graphical user interface to select content from a plurality of sources thereof, the user interface comprising: first and second transversely extending and intersecting scroll bars which each comprise a plurality of scroll bar elements that can be scrolled successively through a focus region positioned at the intersection of the scroll bars, the scroll bar elements of the first scroll bar signifying groupings of content sources, such that when elements of the first scroll bar are scrolled individually into the focus region, the scroll bar elements of the second scroll bar signify content sources which are included within a grouping thereof associated with the individual element of the first scroll bar, at least one of the scroll bar elements of the first scroll bar being pre-programmed to comprise a multiple depiction of more than one of said content source groupings, whereby an individual one of the groupings may be selected from the multiple depiction for the focus region and a viewing region for viewing the contents associated with said content sources selected in dependence on the depiction in the focus region, the method comprising:

selecting an individual one of the groupings from the multiple depiction for the focus region;

moving the selected grouping into the focus region;

displaying sources associated with the grouping in the scroll bar elements of the second scroll bar; and scrolling the second scroll bar through the focus region whereby to select a source therefrom.

21. The method of claim 20 comprising a number of content source groupings previously defined by users using a controller; and the elements of the first scroll bar signifying the user-defined groupings;

at least one of the scroll bar elements of the first scroll is pre-programmed to comprise a multiple depiction of more than one of said user-defined content source groupings; and selecting an individual one of the user-defined groupings from the multiple depiction for the focus region.

22. The method of claim 21 wherein the selecting the user-defined groupings from the multiple depiction includes rotating the elements of the first scroll bar.

23. The method of claim 21 wherein the selecting of the user-defined groupings from the multiple depiction includes shuffling facets which signify the user-defined groupings.

* * * * *